(12) United States Patent
Kim et al.

(10) Patent No.: US 11,089,016 B2
(45) Date of Patent: Aug. 10, 2021

(54) SECURE SYSTEM ON CHIP

(71) Applicant: INDUSTRY-UNIVERSITY COOPERATION FOUNDATION HANYANG UNIVERSITY, Seoul (KR)

(72) Inventors: Dong Kyue Kim, Seoul (KR); Ji-Hoon Kim, Gyeonggi-do (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 77 days.

(21) Appl. No.: 16/076,449

(22) PCT Filed: Feb. 13, 2017

(86) PCT No.: PCT/KR2017/001554
§ 371 (c)(1),
(2) Date: Aug. 8, 2018

(87) PCT Pub. No.: WO2017/138797
PCT Pub. Date: Aug. 17, 2017

(65) Prior Publication Data
US 2019/0114428 A1    Apr. 18, 2019

(30) Foreign Application Priority Data

Feb. 12, 2016  (KR) .......................... 10-2016-0016587
Feb. 13, 2017  (KR) .......................... 10-2017-0019341

(51) Int. Cl.
*H04L 29/06*    (2006.01)
*G06F 21/60*    (2013.01)
(Continued)

(52) U.S. Cl.
CPC ...... *H04L 63/0869* (2013.01); *G06F 15/7807* (2013.01); *G06F 15/7842* (2013.01);
(Continued)

(58) Field of Classification Search
CPC . H04L 63/0869; H04L 9/3278; H04L 9/3263; H04L 9/321; H04L 2209/12;
(Continued)

(56) References Cited

U.S. PATENT DOCUMENTS

2003/0140245 A1*  7/2003  Dahan .................... G06F 21/51
                                                               713/190
2006/0015947 A1*  1/2006  Conti .................. G06F 12/1433
                                                                726/34
(Continued)

FOREIGN PATENT DOCUMENTS

KR    10-2000-0070127 A    11/2000
KR       10-1118826 B1      4/2012
(Continued)

*Primary Examiner* — Mohammed Waliullah (57) ABSTRACT

Disclosed is a secure semiconductor chip. The semiconductor chip is, for example, a system-on-chip. The system-on-chip is operated by connecting normal IPs to a processor core included therein via a system bus. A secure bus, which is a hidden bus physically separated from the system bus, is separately provided. Security IPs for performing a security function or handling security data are connected to the secure bus. The secure semiconductor chip can perform required authentication while shifting between a normal mode and a secure mode.

16 Claims, 9 Drawing Sheets

(51) Int. Cl.
*G06F 21/55* (2013.01)
*H04L 9/32* (2006.01)
*G06F 15/78* (2006.01)
*G06F 21/57* (2013.01)
*G06K 19/073* (2006.01)
*G06Q 20/34* (2012.01)
*G06F 21/74* (2013.01)
*G06F 21/85* (2013.01)

(52) U.S. Cl.
CPC .......... *G06F 15/7853* (2013.01); *G06F 21/55* (2013.01); *G06F 21/556* (2013.01); *G06F 21/57* (2013.01); *G06F 21/60* (2013.01); *G06F 21/602* (2013.01); *G06F 21/74* (2013.01); *G06F 21/85* (2013.01); *G06K 19/07372* (2013.01); *G06Q 20/341* (2013.01); *H04L 9/321* (2013.01); *H04L 9/3263* (2013.01); *H04L 9/3278* (2013.01); *G06F 2221/2149* (2013.01); *H04L 2209/12* (2013.01)

(58) Field of Classification Search
CPC .. G06F 21/556; G06F 21/602; G06F 15/7853; G06F 15/7807; G06F 21/85; G06F 21/74; G06F 21/55; G06F 21/57; G06F 21/60; G06F 15/7842; G06F 2221/2149; G06Q 20/341; G06K 19/07372
See application file for complete search history.

(56) References Cited

U.S. PATENT DOCUMENTS

| | | | |
|---|---|---|---|
| 2013/0276064 A1* | 10/2013 | Ignatchenko | G06F 21/44 726/3 |
| 2015/0113275 A1* | 4/2015 | Kim | H04L 9/3278 713/169 |
| 2016/0154746 A1* | 6/2016 | Cooke | G06F 21/85 713/193 |
| 2017/0177339 A1* | 6/2017 | Shanbhogue | G06F 21/74 |
| 2017/0214662 A1* | 7/2017 | Chu | H04L 63/0823 |
| 2017/0337384 A1* | 11/2017 | Willemse | H04L 9/3213 |

FOREIGN PATENT DOCUMENTS

| | | |
|---|---|---|
| KR | 10-2013-0019358 A | 2/2013 |
| KR | 10-2014-0114263 A | 9/2014 |

* cited by examiner

SECURE SYSTEM ON CHIP

CROSS-REFERENCE TO RELATED APPLICATIONS

This application is a National Stage Entry of PCT International Application No. PCT/KR2017/001554, which was filed on Feb. 13, 2017, and which claims priority from Korean Patent Application No. 10-2016-0016587 filed with the Korean Intellectual Property Office on Feb. 12, 2016, and Korean Patent Application No. 10-2017-0019341 filed with the Korean Intellectual Property Office on Feb. 13, 2017. The disclosures of the above patent applications are incorporated herein by reference in their entirety.

BACKGROUND

1. Technical Field

The present invention relates to a system-on-chip (SoC) structure and an operation method thereof, more particularly to the hardware structure and operation of a secure SoC with which to prevent security attacks.

2. Description of the Related Art

Among techniques for preventing security attacks, there are known techniques that involve preventing security attacks in hardware modules. For example, current processors may adopt ARM TrustZone technology for increased security. The TrustZone technology separates a singly physical processor core into the virtual cores of a normal world and a secure world. These two are differentiated from each other as regards the CPU, memory, memory address conversion, etc. As certain application programs or tasks are isolated to just one side, the technique may achieve increased security.

With the TrustZone technology, entering the secure world from the normal world requires entering a monitor mode by way of a special CPU command, i.e. a SMC (secure monitor call). Also, when the device is powered on, the secure world OS (operating system) is booted through the secure world bootloader, after which the normal world OS is booted through the normal world bootloader.

US Patent Publication No. 2013/0145475 (published Jun. 6, 2013) presents a security technique for a handheld device having the hardware structure of TrustZone from ARM Ltd., where the technique prevents the user PIN from being leaked by a security attack using software such as malware, etc., by dividing the touchscreen into a secure layer and a non-secure layer.

The technological document "ARM Security Technology: Building a Secure System using TrustZone® Technology" (ARM Limited, White-Paper PRD29-GENC-009492C, April 2009) provides the hardware structure for TrustZone of ARM Ltd., as well as material regarding the implementation and operation of the secure world and normal world therein.

SUMMARY OF THE INVENTION

An aspect of the invention is to provide a secure system-on-chip that can be operated in a safe environment by preventing security attacks.

One aspect of the invention provides a semiconductor chip that includes: a processor core; a first group including elements that are connected to the processor core by a first bus; and a second group including elements that are connected to the processor core by a second bus and are configured to operate in a secure mode.

According to an embodiment of the invention, the second bus may be physically separate from the first bus so that the second group may be physically isolated from the first group. Here, the second group can process data by using a memory address different from that of the first group.

In one example which does not limit the invention in any way, the processor core may include a Core-A processor, which may be a 32-bit RISC (reduced instruction set computing) type embedded processor. In this embodiment, the second bus may include a hidden bus that is implemented by using an ASR (application specific register) of the Core-A processor as an address space for controlling elements included in the second group. In this case, the second group can use an MTA (move to ASR) command and an MFA (move from ASR) command, which are commands for processing data in relation to the ASR, in the secure mode for processing secure instructions. This can be understood as implementing a hidden bus for secure IP's included in the second group by using the ASR interface.

According to another embodiment of the invention, the processor core can be a RISC-V ISA applied CPU core.

According to an embodiment of the invention, the processor core may partition a memory area into a code area and a data area and may include a memory protection unit (MPU) that prohibits writing in the code area and prohibits execution in the data area. The code area and the data area can be configured according to secure instructions that are processed using commands associated with the ASR of the Core-A processor. Furthermore, a system area other than the code area and the data area can also be configured.

According to an embodiment of the invention, the processor core can include a shadow stack that is configured to backup a return address included in a code sequence. In this case, the shadow stack can be located in the same or a separately added memory as the stack residing in the existing memory or in a separately added register, etc. The shadow stack may not use a bus, may not be accessed by the OS or software, and may be automatically executed when a command related to a memory stack is executed by the added hardware-based control circuit, thereby dually managing the return address.

According to an embodiment of the invention, the semiconductor chip may further include an authentication part that performs mutual authentication with an outside trusted authority when the semiconductor chip is powered on. The semiconductor chip can make the second group usable only if the authentication is successful. While the second group is usable after successful authentication and while the first group is operating in the normal mode, if there is a security violation event or a call for processing at an increased security level, the secure mode can be activated. In this secure mode, at least some of the second group can be operated by secure instructions to perform their designated functions. According to an embodiment of the invention, at least one of a cryptographic IP, a secure SRAM, a secure DMA, and a boot ROM may be included.

According to an embodiment of the invention, the semiconductor chip can further include a PUF that is configured to provide the root key used by the authentication part for the mutual authentication with the outside trusted authority. In an example which does not limit the invention, the PUF can be included intrinsically in the semiconductor chip by using a processing tolerance in the semiconductor manufacturing process. In an example implementation, the PUF can involve vias or interlayer contacts that are laid out between conductive layers of the semiconductor, with the vias or contacts patterned normally during a process, whereby a digital value may be provided according to whether or not the conductive layers are short-circuited.

Another aspect of the invention provides an operation method for a semiconductor system-on-chip. The operation method can include: an authentication part performing mutual authentication with an outside trusted authority; and activating a first group comprising elements connected to the processor core by a first bus and deactivating elements connected to the processor core by a second bus and configured to operate in a secure mode, if the authentication is not successful. According to an embodiment of the invention, the second group can be a secure IP group that includes at least one of a cryptographic IP, a secure SRAM, a secure DMA, and a boot ROM.

According to an embodiment of the invention, the root key used by the authentication part in the mutual authentication with the outside trusted authority can be provided by a PUF included within the semiconductor system-on-chip.

According to an embodiment of the invention, the operation method can further include activating the secure mode to operate at least a portion of the second group if there is a security violation event or a call for processing at an increased security level during an operation of the first group while the second group is in a usable state due to the authentication being successful.

According to an embodiment of the invention, the processor core can include a hardware-based shadow stack that does not use a bus, is not accessed by an OS or software, and is configured to back up a return address included in a code sequence. In this case, the operation method can further include backing up the return address when the processor core executes a command related to a memory stack and detecting an attack by comparing with the return address previously stored in the stack of the memory.

The present invention can provide a SoC platform that can be operated in a safe environment by preventing security attacks.

DETAILED DESCRIPTION OF THE INVENTION

Certain embodiments of the invention will be described below in more detail with reference to the accompanying drawings. However, the scope of rights is not constrained by or limited to such embodiments. In the drawings, the same reference numerals represent the same components.

While the terms used in the descriptions below are those that are typically and commonly used in the relevant field of technology, different terms can be used under different circumstances due to technological advances and/or changes, traditions, preferences of technicians, etc. Thus, the terms used in the descriptions below must not be understood to be limiting the technical spirit and are to be understood as illustrative terms.

Furthermore, in certain cases, some of the terms used were arbitrarily chosen by the applicant, and in such cases, the detailed meanings of the terms may be disclosed in the corresponding descriptions. Thus, the terms used in the descriptions below should be understood not only by how the terms are named but by the meanings conveyed by the terms as well as the context of the overall specification.

Security Attack on System-on-Chip Software

An attack on a SoC may include physical attacks and software attacks. If a physical attack could be neutralized and the software system could be protected by a secure SoC platform, then developers can concentrate on their work without being bothered by security issues. The embodiments presented here may provide a SoC platform that operates in a safe environment by preventing security attacks on software.

As it is sometimes difficult to defend against software attacks with only a software module, it is desirable to defend against security attacks at the hardware module level. For example, an environment such as that used by TrustZone from ARM Ltd. can be used. In order to use TrustZone, a secure OS (operating system) or a secure library defined according to the TEE (trusted execution environment) standard may be required. However, the performance requirements for the TEE can be at a level that is difficult to satisfy with a small CPU core and SoC's for end nodes in the IoT (Internet of things) that use real time OS (RTOS). Certain embodiments of the invention present a SoC that is equipped with a secure ISA (instruction set architecture) capable of directly supporting a TEE instead of a secure OS or secure library, which may incur a large overhead. Certain embodiments relating to a CPU core capable of implementing such secure ISA and an operation method of the CPU core are also presented. Various embodiments of the invention are described below with reference to the drawings.

System Overview—Physical Separation of Normal World and Secure World

Figure 1:
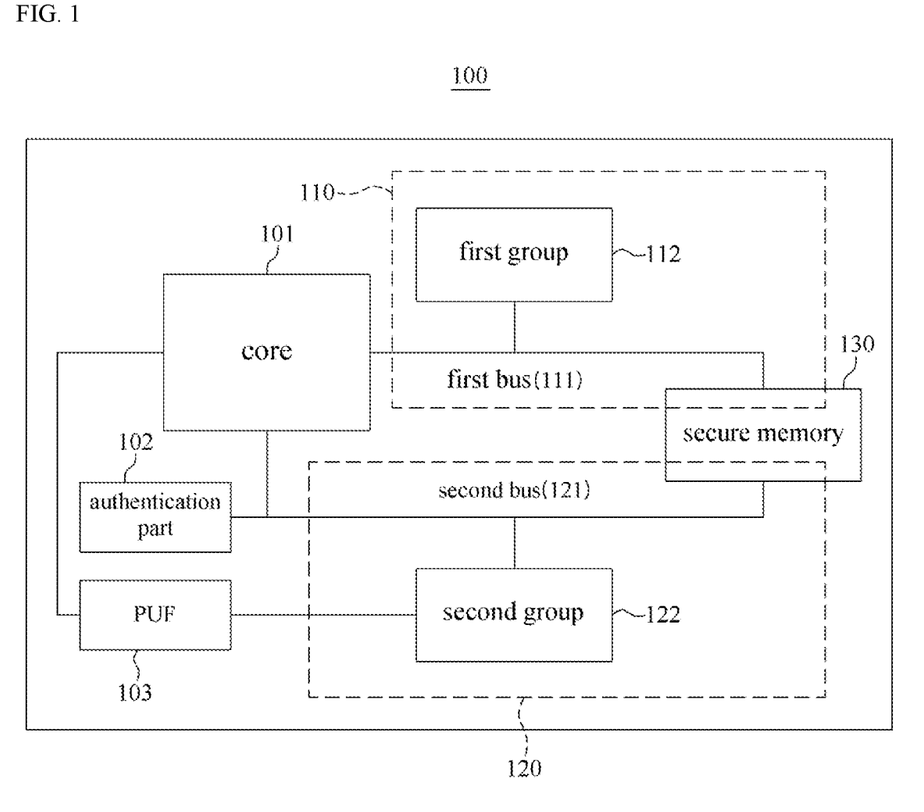
FIG. 1 is a block diagram of a SoC device according to an embodiment of the invention.

FIG. 1 is a block diagram of a semiconductor system-on-chip 100 according to an embodiment of the invention. The chip may include a processor core 101. The core 101 may have a first bus 111 and a second bus 121 connected separately. The first bus 111 may be provided to a first group 112, which may be a general computing group that operates in the normal mode. A 'group' can be understood as a set of individual computing property (or IP—intellectual property—), memory, cache, etc. In the following descriptions, elements, IP, functional elements, computing property, etc., can be used interchangeably even when there is no specific mention that this is so.

The second bus 121 may be provided to a second group 122 that includes elements that operate only in the secure mode. The second bus 121 may be physically completely separated from the first bus 111. This physical isolation allows a differentiation between a normal world 110 and a secure world 120, and this differentiation provides a SoC that is robust to security attacks against software. The physical isolation can be understood to mean that data is processed with the first group 112 of the normal world 110 having a memory address system that is completely different from that of the second group 122 of the secure world 120.

The SoC 100 can include an authentication part 102 that performs mutual authentication for the secure world 120 with an outside certificate authority (not shown) when the system is powered on and/or when there is a need for running the secure mode. The authentication part 102 can receive authentication by proving to the outside trusted authority that the SoC 100, the second group 122 and its individual IP's, as well as the software embedded therein are proper and faultless. Also, the authentication part 102 may perform mutual authentication by ascertaining that the outside terminal with which a current transaction is being carried out is the outside trusted authority and can be trusted.

Switching between Normal Mode and Secure Mode

The SoC can have a normal mode and a secure mode. Only when the authentication by the authentication part 102 described above is successful may the second group 122 be booted and the secure world 120 associated with the trusted execution environment (TEE) be activated. Of course, in this case, the first group 112 may be booted and the normal world 110 may be activated also. However, if the authentication has not been completed, only the first group 112 associated with a rich execution environment (REE) may be booted, so that the normal world 110 may be activated, but the secure world 120 may not be activated.

Even when the secure world 120 is activated, the second group 122 may not necessarily be always operational and can be in an idle state. During computing in the REE environment, for example while an Android operating system and applications are being run, the secure mode can be activated when there is a call for processing at an increased security level, such as when a security violation occurs or when a financial payment is required. In other words, in the normal world, a REE (rich execution environment) such as Android in mobile phones may operate with typical hardware IP's in an ARM-based SoC. Then, when secure resources such as a cryptographic IP or a secure SRAM is needed, a TEE made up of a secure OS and secure hardware IP's may operate and transmit results to the REE. TrustZone of ARM Ltd. additionally provides a 1-bit bus signal to an AMBA AXI as a control signal for accessing the secure IP's of the SoC platform. It may be difficult for regular small CPU cores and SoC's at IoT (Internet of things) end nodes using RTOS (real time OS) to satisfy the performance requirements for the TEE, but certain embodiments of the invention make this possible.

Means of Authentication

According to an embodiment of the invention, the semiconductor SoC 100 can further include a PUF (physical unclonable function) 103 that provides a root key used by the authentication part 102 in performing the mutual authentication with the outside trusted authority. At least one of various algorithms such as RSA, AES, etc., that use such a root key can be used in the authentication. In one example which does not limit the invention, the PUF can be included intrinsically in the semiconductor chip by using a processing tolerance in the semiconductor manufacturing process. In an example implementation, the PUF can involve a via or an interlayer contact that is laid out between conductive layers of the semiconductor, with the via or contact patterned normally during a process, whereby a digital value may be provided according to whether or not the conductive layers are short-circuited. A more detailed description of the implementation and role of the PUF will be provided later on with reference to FIG. 5 and FIG. 6.

Secure Memory

According to an embodiment of the invention, a secure memory 130 may include an area utilized in the normal mode and an area utilized in the secure mode. The secure memory 130 may include, for example, a non-volatile memory (NVM). The area utilized in the secure mode can store data after encryption using the root key provided by the PUF 103 instead of storing the data as is. Therefore, even if the data of the secure memory 130 is physically extracted, the data would be meaningless if it is not directly connected with the PUF 103 and decoded.

Example System Implementation

Figure 2A:
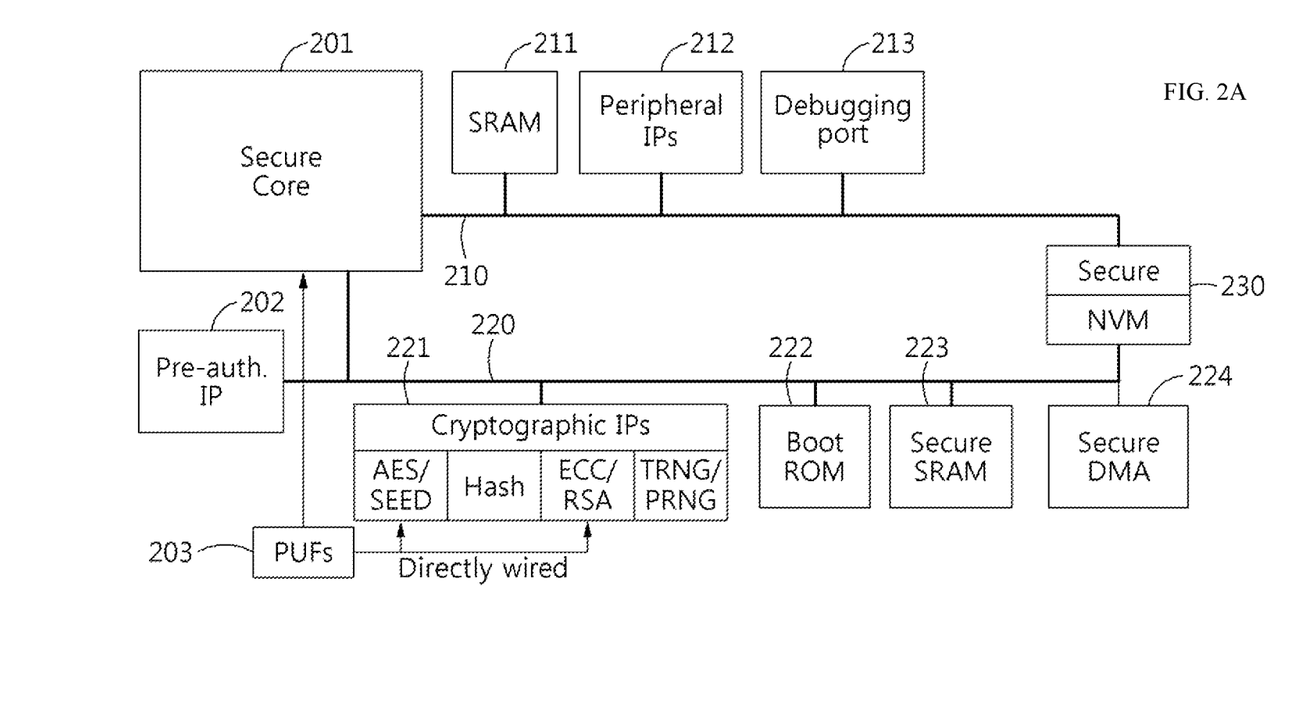
FIG. 2A and FIG. 2B illustrates the structure of a SoC according to an embodiment of the invention.
Figure 2B:
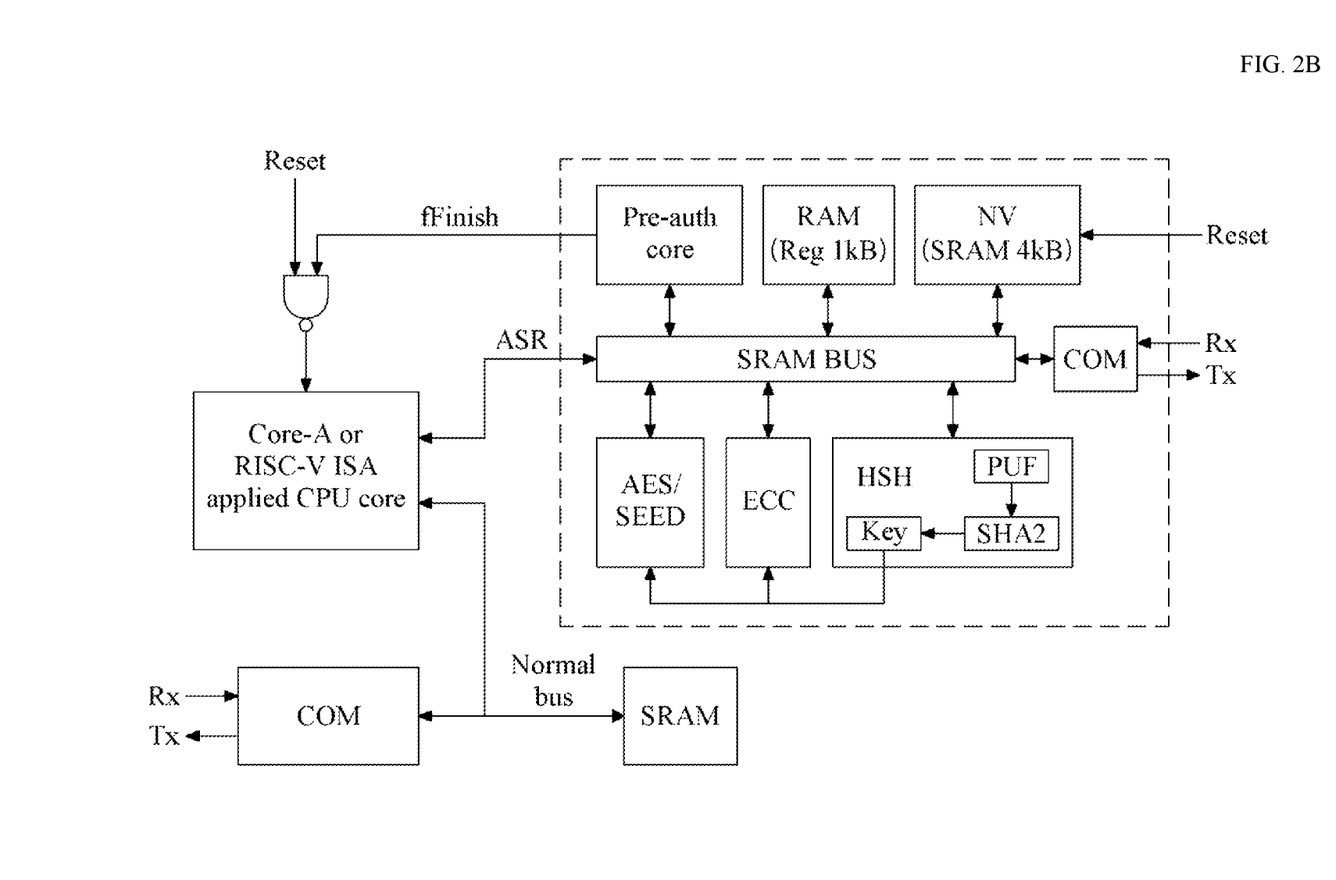

FIG. 2A and FIG. 2B illustrate a structure for implementing a SoC according to an embodiment of the invention. In an example which does not limit the invention, the processor core may include a Core-A processor 201, which is a 32-bit RISC (reduced instruction set computing) type embedded processor. According to another embodiment, the processor core can also be a CPU core to which the RISC-V ISA has been applied. In the descriptions that follow, 'processor', 'processor core', 'secure core', 'secure processor', etc., should be understood as terms that can be used interchangeably. While the descriptions focus on an implementation using 'Core-A' as an example, it should be apparent to the person skilled in the art that different implementations are possible, such as those using a RISC-V ISA applied CPU core.

Referring to FIG. 2A, the SRAM 211, peripheral IP's 212, and a debugging port 213, which are first group elements of the REE environment, may be connected to a normal bus 210. Also, to a secure bus 220, cryptographic IP's 221, a boot ROM 222, a secure SRAM 223, and a secure DMA 224, which are to be operated in the TEE environment, may be connected. As described above with reference to FIG. 1, an authentication part 202 and at least one PUF's 203 can be present for performing authentication. The PUF's 203 may be directly connected to the core 201 for the authentication and can also be directly connected to the AES/SEED IP and ECC/RSA IP, from among the cryptographic IP's. Furthermore, a secure NVM 230 may also be directly connected to the PUF's 203 to safely store data in an encrypted form.

FIG. 2B illustrates an example implementation of a secure bus 220. The secure bus can be a hidden bus that is implemented by using the ASR (application specific register) of the Core-A processor as the address space for controlling the second group elements of the secure world. In this application, the second group can use a MTA (move to ASR) command and a MFA (move from ASR) command, which are data processing commands relating to the ASR, in processing secure instructions in the secure mode. This can be understood as using the ASR interface to implement a hidden bus for secure IP's included in the second group.

According to such an implementation, a secure ISA (instruction set architecture) capable of directly supporting the TEE may be implemented instead of a secure OS or library having a large overhead. This may thus be more suitable for devices having small CPU's compared to using TrustZone of ARM Ltd. In certain embodiments, a pre-authentication hardware may be provided, which may be an authentication part for managing the secure mode differentiated from the normal mode. Also, since there are provided mutual authentication hardware IP's that use VIA-PUF (physical unclonable function), of which the reliability, stability, and randomness have been already verified, a 'secure SoC platform' may be provided that has a strengthened secure world. According to the presented embodiment, a secure ISA may be provided. This may be an ISA for the secure world version that is implemented separately from a regular ISA. Accessing resources within the secure world by a method based on the existing TrustZone technology of ARM Ltd. may require a secure OS or a complicated library. With the proposed study, however, the resources within the secure world can be accessed immediately at the command level based on the secure ISA.

Also, by managing the secure mode with respect to the secure ISA by using a pre-authentication IP, the mutual authentication may be performed in a safe manner, and internal access by unauthorized users such as software attacks, for example, may be blocked. A secure core proposed according to the embodiment may provide a hidden channel to the secure world, and this may be physically separated from the main memory interface. Also, when software is being read, the secure DMA may be used for an automatic integrity check by the hardware, and an internal PUF may provide a key for a secure storage space or secure IP's for authentication. A more detailed description of the above is provided as follows.

Secure ISA (Instruction Set Architecture)

In order to use resources within the secure world or call a secure function according to the existing method, it may be needed to operate a secure OS or library at the general CPU core. However, an embodiment of the invention may satisfy the requirements for the secure world and provide the characteristic functionality of the secure OS and library while providing a secure ISA having no overhead, thus functionally expanding the conventional Core-A. This makes it possible for the security system to directly access TrustZone without the help of a secure OS or library or without the difficulty of application development, as well as to reduce efforts for management. Some main features of a secure ISA according to an embodiment of the invention may be as follows.

control flow integrity: the code for protecting the integrity of the control flow may be substituted by a single command for efficiency key management: generation of random numbers and key pairs included for public key encryption memory security level management: varying security level provided for each page and segment security engine: ISA expansion that operates closely with secure hardware engine secure booting/authentication: authentication for secure debugging and booting supported secure mode management: management of microstructures for secure mode supported register content protection: content of secure register encrypted with VIA-PUF Secure Mode An embodiment of the invention, in order to increase the level of security, may permit use of the secure ISA only to authenticated users. The authentication process and detailed processing procedures are described with reference to FIG. 3A and FIG. 3B. As described above, the SoC 300 may include a portion 310 that processes authentication and operates in the secure mode.

Figure 3A:
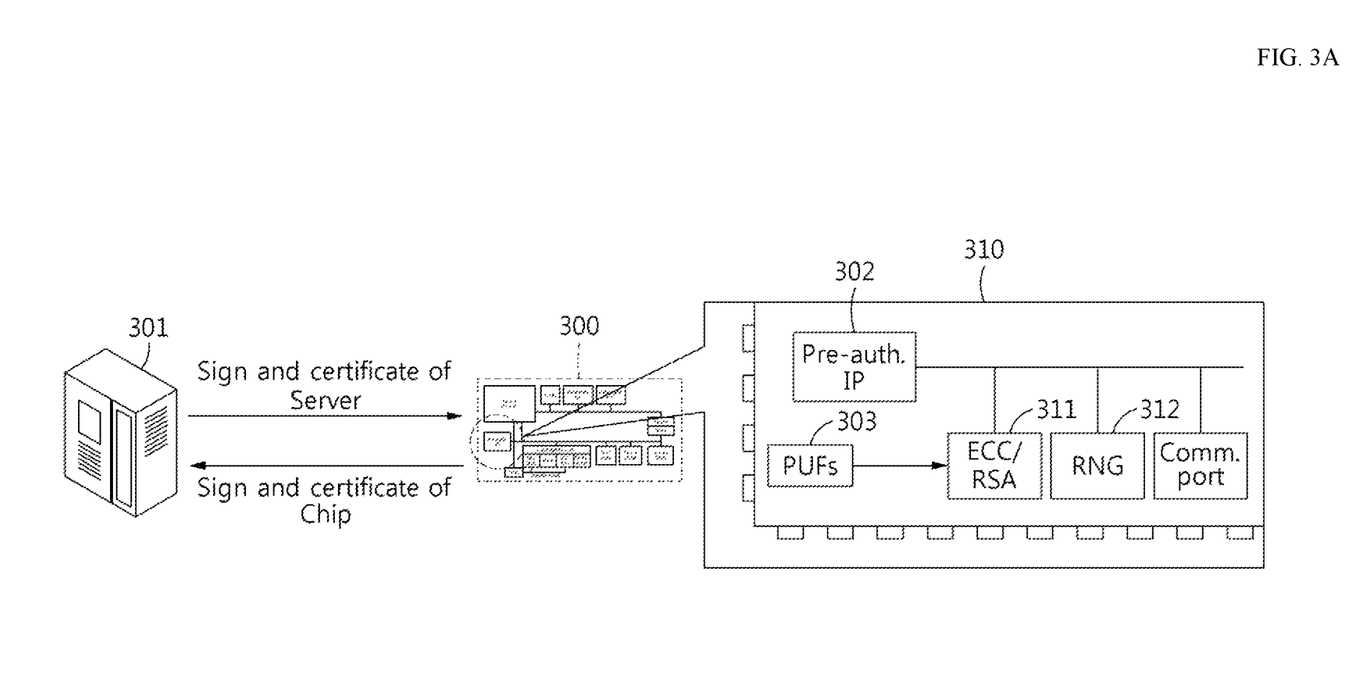
FIG. 3A and FIG. 3B are diagrams for describing an authentication process according to an embodiment of the invention and the detailed processing procedures.
Figure 3B:
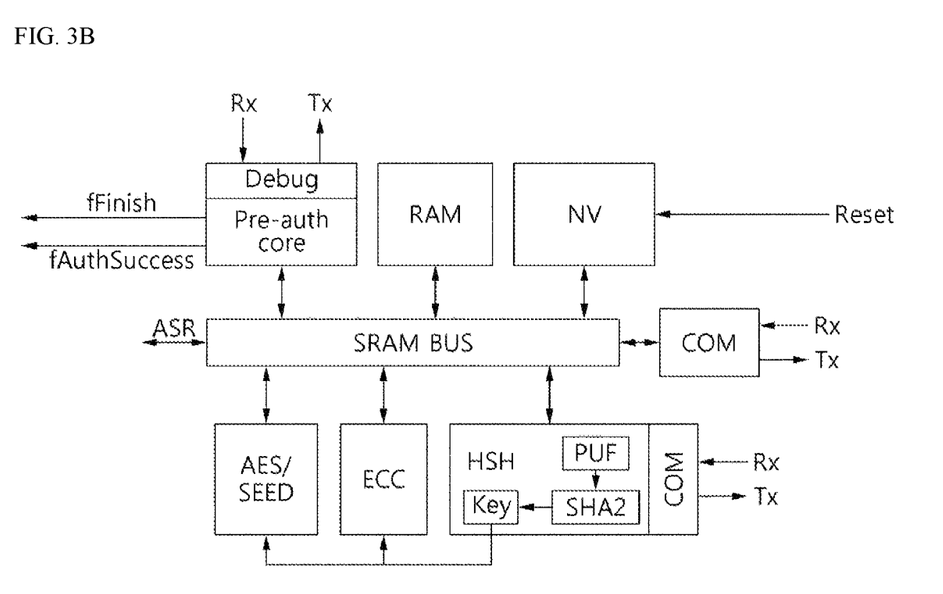

The secure mode is described, in which the secure ISA can all be used. Generally, when an end node SoC performs a secure computation, all applications may have to receive authentication from an outside certificate server. According to an embodiment of the invention, a pre-authentication IP 302, which is a hardware-based authentication part, can communicate with an outside certificate server 301 through mutual authentication between end nodes when power is turned on or reset.

As in the example implementation, which does not limit the invention, the mutual authentication can be based on a public key encryption method using a root key created by a PUF 303. The server 301 and the proposed platform 300 may each generate a signature with its own personal key and have its own public key included in the certificate. The mutual authentication may be performed by exchanging certificates and signatures. The pre-authentication IP 302 may obtain the private key from the VIA-PUF 303 and may transmit a signature generated using the key to the certificate server. Also, the received signature may be verified using the public key of the outside certificate server that was previously stored. Here, the signature algorithm may be a public key encryption algorithm and can be ECC or RSA. When the system enters the secure mode after the mutual authentication is successful, the secure core may control secure booting. Also, the debugging port can be opened only in the secure mode, so that only authenticated users are able to perform debugging. The secure mode can be permitted when the authentication is successful, and the IP resources (311, 312, etc.) of the secure world can be permitted to operate.

Utilization of Core-A Processor Features

In order to support the TEE in an end node SoC, each embodiment may require a design for a secure CPU core that provides new features for the ISA. The Core-A is a 32-bit CPU core that is free to use and thus may be a good starting point for developing a secure core. The features of Core-A are as listed below.

TABLE 1

| | Description |
| --- | --- |
| Overview | 32-bit RISC (reduced instruction set computer) processor having Harvard structure |
| Features | Supports a maximum of four coprocessors. ASR (application specific register) interface |
| Commands | Load-Store structure |
| | programmable delay slot within branch commands |
| | easy generation of MUI commands and 32-bit constants |
| | NOP field in every command to allow avoidance of NOP commands |

Originally, a 5-stage pipeline Core-A CPU may use a GCC-based Core-A compiler to exhibit performance similar to that of an ARM9E-S CPU in the EEMBC CoreMark Benchmark. The ASR interface of Core-A can be used as a scratch-pad memory for storing frequently used data or as a transaction memory-mapped interface similar to AMBA AXI-Lite. The address space of the ASR may not be included in the main memory area and may be physically separated from the main memory interface to be useable only by way of a particular command. With appropriate secure mode management, the embodiment presented here may use the ASR interface as a hidden secure bus for accessing secure IP's. Incidentally, Core-A is widely being used in fabless companies in the Republic of Korea. Core-A is being supported by Dynalith Systems, and Core-A is basically open-source so that use of the ISA of Core-A is free. Certain embodiments can be understood to be user-defined, expanded versions of the ISA of Core-A.

Secure World having Increased Security

Figure 4:
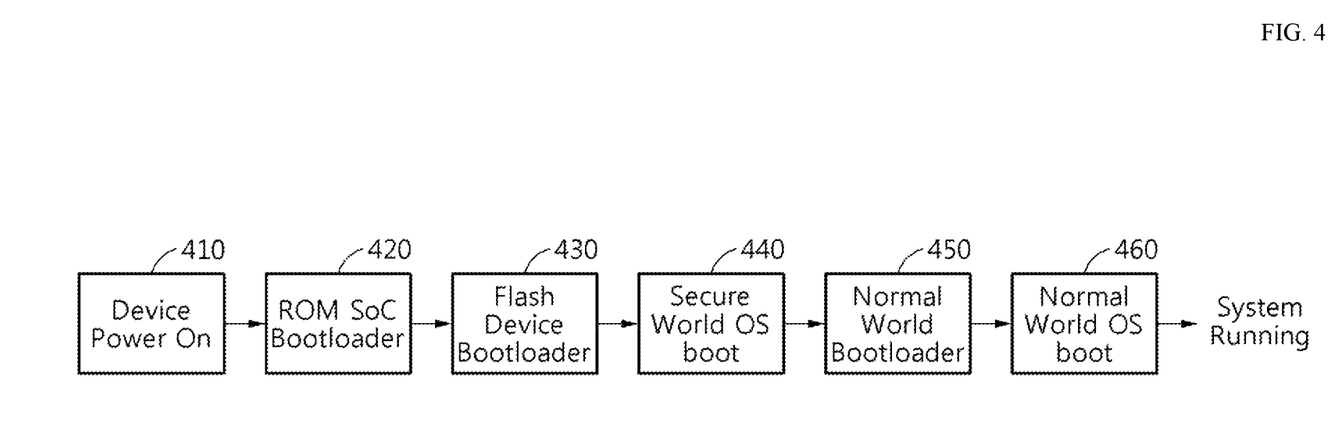
FIG. 4 is a flow diagram for describing the flow of a secure booting according to an embodiment of the invention.

Some example features of a secure world strengthened based on a VIA-PUF and a secure core according to an embodiment of the invention are as follows. FIG. 4 is a flow diagram for describing the flow of secure booting according to an embodiment of the invention. The descriptions below refer to FIG. 4.

secure booting: This is to ensure integrity for the entirety of the software image executed subsequently and can prevent the execution of unauthorized or maliciously modified software. When the device is powered on (410), the SoC bootloader 420 of the ROM may be given authority and by way of the flash device bootloader 430, which verifies the integrity of the secure world OS, the secure world OS may be booted (440). Then, the normal world bootloader 450 may be given authority to boot the normal world OS (460), and the system may be operated. In this flow, the procedures in later steps sequentially inherit the integrity verification of previous steps, preventing the intervention of attacks therebetween. Since, during these procedures, a secure ISA according to certain embodiments of the invention supports secure booting while rendering the entire process non-preemptive, attempts such as time-of-check to time-of-use (TOCTTOU) attacks can be prevented.

physical separation of the secure world based on a hidden bus: As described above, an embodiment of the invention may utilize the hidden ASR interface of Core-A as a hidden bus that is used only in the secure mode. Such a hidden bus is for the secure world and may serve to completely physically separate access paths to the secure world such as the secure IP's, on-chip boot ROM, and secure SRAM from the main memory interface/bus.

secure DMA (direct memory access): During a DMA transmission to the embedded SRAM in a non-volatile memory, an integrity check of the software may be performed, and whether or not to execute the corresponding code may be determined according to the integrity check result.

PUF-based secure storage space: Secure data stored in the non-volatile memory may be encrypted using the VIA-PUF as a root key.

secure SRAM: may be physically separated from the normal area.

Increasing Security using a PUF

A PUF (physical unclonable function) according to an embodiment of the invention can generate a true random bit unique to the chip by using process variation resulting from the semiconductor manufacturing procedure. Since the process variation resulting from the semiconductor manufacturing procedure is different for each chip, the PUF can be utilized as a unique ID of the chip in mass production of chips, and this can provide a root key that may be utilized in encryption/decryption, memory protection, electronic signature, etc.

The value of such PUF is not easily leaked to the outside and thus can provide the highest level of security as a root of trust. Currently, there are standardization and commercialization efforts under way for using the PUF for security purposes in various applications including military weapons such as intercontinental ballistic missiles (ICBM), etc., vehicle security systems (HSM), AP's for smart phones, smart cards, and others.

Figure 5:
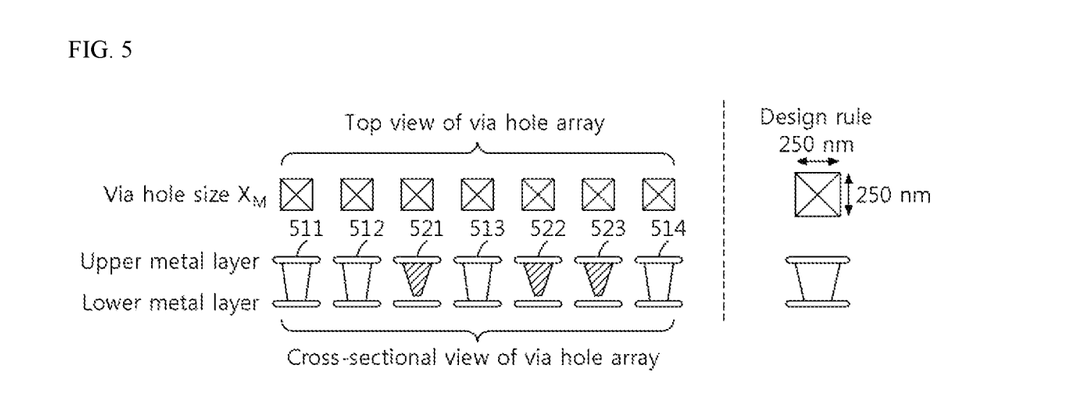
FIG. 5 is a conceptual diagram for describing the implementation of a PUF according to an embodiment of the invention.

FIG. 5 is a conceptual diagram for describing the implementation of a PUF according to an embodiment of the invention. It should be noted that this is merely an example implementation and that the invention is not limited thereto. According to an embodiment of the invention, the PUF may have a via (or interlayer contact) array that is manufactured by designing the via holes to have sizes smaller than the via hole size specified in common design rules (in the illustrated example, the size is 250 nm*250 nm). In this case, open and shorted via holes are randomly distributed in the via hole array, and this setup can provide digital values that are random and substantially invariant over time. A VIA PUF manufactured according to the embodiment presented above has passed various tests based on the JEDEC standard as applied by official assessment agencies, proving its reliability, and has also passed the randomness test applied with the true random number testing suite based on the NIST standard of SP 800-90B.

Description of Additional Embodiment

Figure 6:
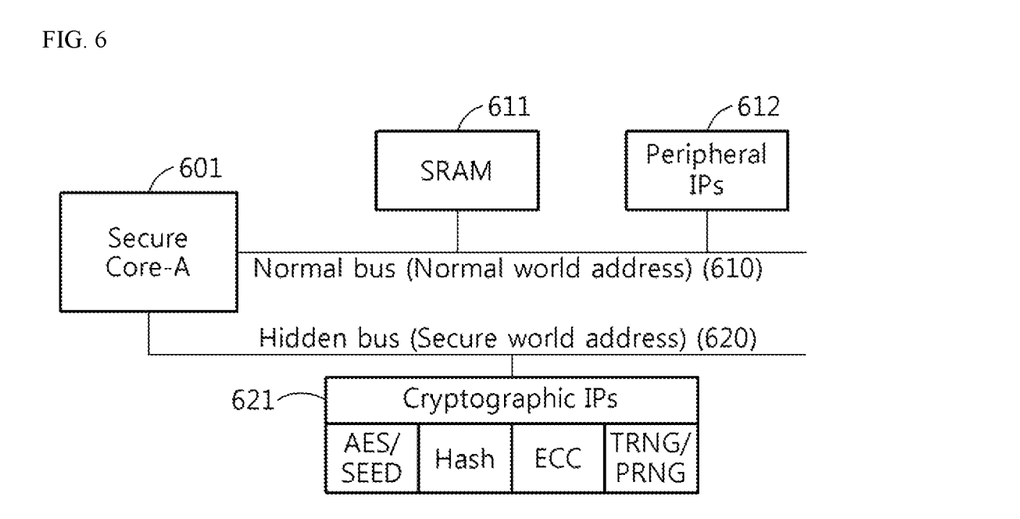
FIG. 6 illustrates a secure SoC platform that is fundamentally protected from physical attacks according to an embodiment of the invention.

FIG. 6 illustrates a secure SoC platform that is fundamentally protected from physical attacks according to an embodiment of the invention.

A hidden bus 620 may be provided for the secure world in addition to the normal bus 610 that performs computing in the REE environment connected to the secure core 601. When the SRAM 611 or the peripheral IP's 612 require activating the secure mode during operation, secure IP's 621 can be operated at the command level via a secure ISA.

According to an embodiment of the invention, the secure core 601 may partition the memory area into a code area and a data area. While the partitioned memory area can be that of the normal world, it can also be of the secure world in another embodiment. The secure core 601 can include a memory protection unit (MPU) that prohibits writing in the code area and prohibits execution in the data area. Here, the code area and the data area can be configured by secure instructions that are processed using commands associated with the ASR of the Core-A processor. Furthermore, the system area can also be configured in addition to the code area and the data area.

TABLE 2

| Area | Mode | | | |
|---|---|---|---|---|
| | U/N | U/S | P/N | P/S |
| Code Area | RX | RX | RWX | RWX |
| Data Area | RW | RW | RW | RW |
| System Area | — | — | RWX | RWX |

In the table above, mode "U" represents a user mode, and "P" represents a privilege mode. Also, "N" represents the normal mode, and "S" represents the secure mode. The actions permitted for each code area are listed. For example, in the user mode and normal mode, reading marked as R and execution marked as X are permitted, but writing W is not permitted.

According to an embodiment of the invention, the processor core can include a hardware-based shadow stack that makes a backup of the return address included in the code sequence. In this case, the shadow stack can be located in the same or a separately added memory as the stack residing in the existing memory or in a separately added register, etc. The shadow stack may not use a bus, may not be accessed by the OS or software, and may be automatically executed when a command related to the memory stack is executed by the added hardware-based control circuit, thereby dually managing the return address. Due to the dual management of the return address using a shadow stack, any changes made by a software attack to the return address stored in the stack residing in the existing memory can be detected. Since the shadow stack may be controlled only with a hardware circuit and cannot be accessed by software, any attack attempting to change the contents stored in the shadow stack can be fundamentally avoided. The shadow stack described above is an example of dually managing the return address, and the invention is not limited to a particular exemplary implementation as long as the stack enables dual management by frequently updating the shadow stack whenever there is an update of the return address.

System Operation Flow

Figure 7:
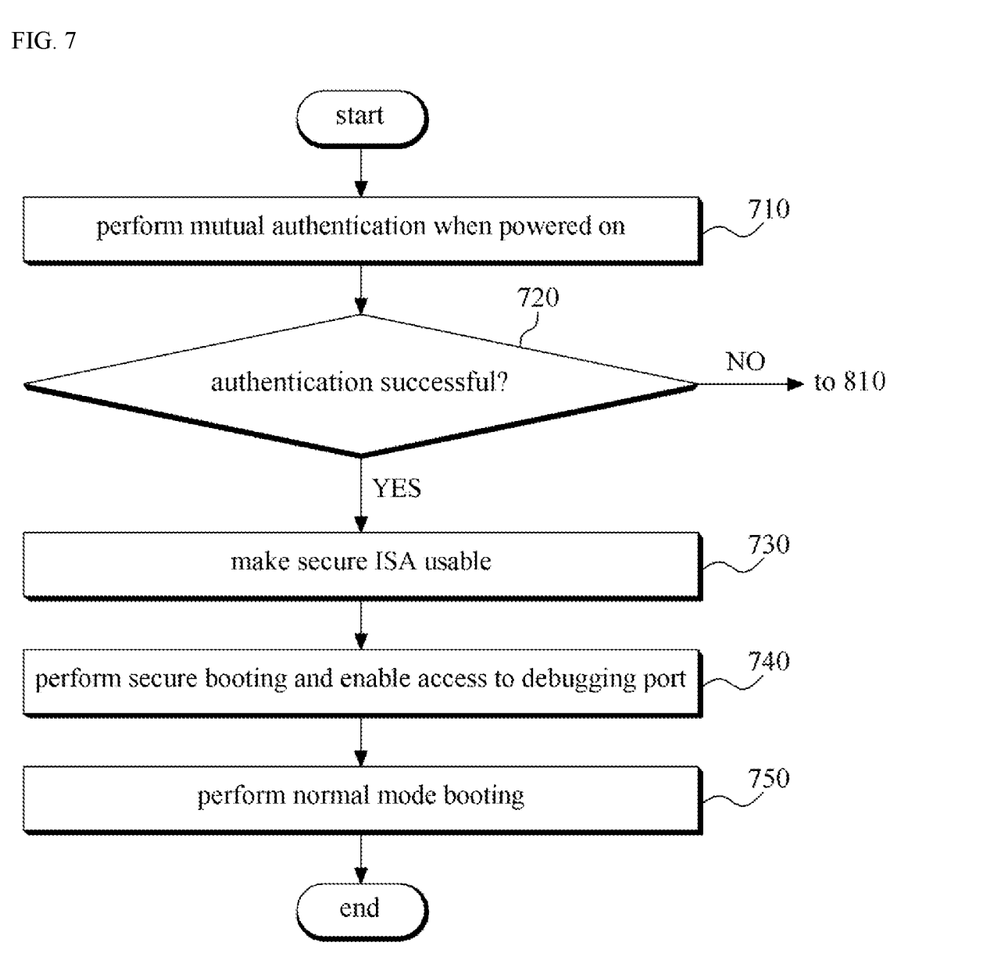
FIG. 7 and FIG. 8 are flow diagrams for describing the operation of a SoC according to an embodiment of the invention.
Figure 8:
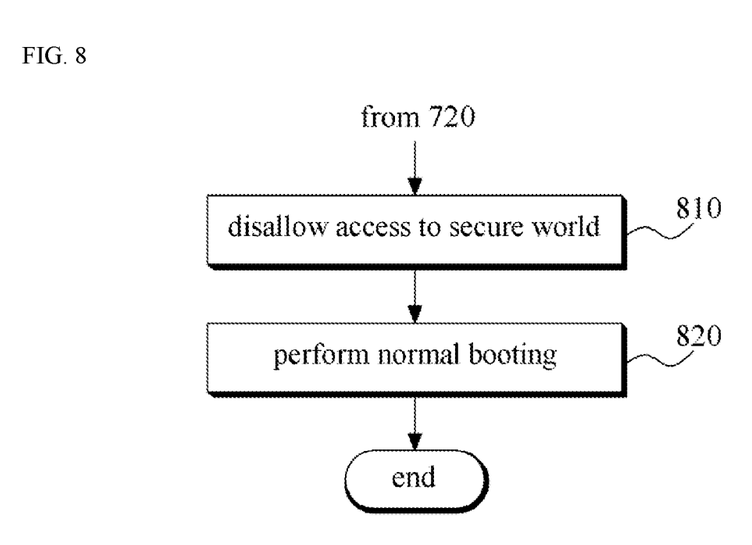

FIG. 7 and FIG. 8 are flow diagrams for describing the operation of a SoC according to an embodiment of the invention. According to an embodiment of the invention, a procedure of receiving authentication by a certificate server may be performed when the device is powered on (710). Here, the details of how a hardware-based authentication part, i.e. the pre-authentication IP, may communicate with an outside certificate server for mutual authentication between end nodes are as described above with reference to FIG. 3A, and a description of how a PUF may be used in this process is provided above with reference to FIG. 5.

If the authentication is successful in step 720, then the secure ISA may be made available (730), and access to the debugging port may be permitted and the secure world OS may be booted (740). Then, normal mode booting may be performed to render the system operable (750).

However, if the authentication fails in step 720, then in step 810 of FIG. 8, the secure world may be made inaccessible. Only the normal world may be booted, so that computing operations only in the REE environment are permitted. The relevant procedures are as described above with reference to FIG. 1, FIG. 2, FIG. 4, etc.

The SoC device and platform described above can be implemented as one or more hardware components, one or more software components for controlling the hardware components, and/or one or more combinations of hardware components and software components. For example, the device and components in the embodiments described above can be implemented by using one or more general purpose computer or special purpose computer, which may include, for example, a processor, a controller, an ALU (arithmetic logic unit), a digital signal processor, a microcomputer, a FPA (field programmable array), a PLU (programmable logic unit), a microprocessor, or any other device capable of executing and responding to instructions.

The software can include a computer program, code, instructions, or a combination of one or more of the above to configure a processing device to operate as desired or command a processing device independently or collectively. The software and/or data can be permanently or temporarily embodied as a type of machinery, component, physical device, virtual equipment, computer storage medium or device, or transmitted signal wave to be interpreted by a processing device or to provide instructions or data to a processing device. The software can also be distributed over computer systems connected over a network and can be stored or executed in a distributed manner. The software and data can be stored on one or more computer-readable recorded medium.

An operation method for a SoC according to an embodiment of the invention can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the embodiment or can be a type known to and used by the skilled person in the field of computer software. A computer-readable medium may include a hardware device that is specially configured to store and execute program instructions. Some examples may include magnetic media such as hard disks, floppy disks, and magnetic tapes, optical media such as CD-ROM's and DVD's, magneto-optical media such as floptical disks, and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments, and vice versa.

While the embodiments of the invention are described above with reference to a limited number of drawings, a person having ordinary skill in the relevant field of technology would be able to derive various modifications and alterations from the disclosure provided above. A satisfactory result may be achieved, for example, by performing the procedures described above in an order different from that of a method described above and/or by coupling or combining components of the above-mentioned systems, structures, devices, circuits, etc., in a form different from that described above or replacing or substituting certain components with other components or equivalents. Therefore, other implementations, other embodiments, and equivalents of the claims set forth below are encompassed within the scope of claims.

What is claimed is:

1. A semiconductor chip comprising:
    a processor core;
    a first group comprising elements connected to the processor core by a first bus; and
    a second group comprising elements connected to the processor core by a second bus and configured to operate in a secure mode,
    wherein the second group processes data by using a memory address different from that of the first group, and
    wherein the processor core partitions a memory area into a code area and a data area and comprises a memory protection unit, the memory protection unit configured to prohibit writing in the code area and prohibit execution in the data area,
    wherein the processor core comprises a RISC (reduced instruction set computing)-V processor, the RISC-V processor being a 32-bit RISC type embedded processor,
    wherein the second bus comprises a hidden bus implemented by using an ASR (application specific register) of the RISC-V processor as an address space for controlling elements included in the second group.

2. The semiconductor chip of claim 1, wherein the second bus is physically separate from the first bus so that the second group is physically isolated from the first group.

3. The semiconductor chip of claim 1, wherein the second group uses an MTA (move to ASR) command and an MFA (move from ASR) command in the secure mode for processing secure instructions, the MTA command and the MFA command being commands for processing data in relation to the ASR.

4. The semiconductor chip of claim 1, wherein the code area and the data area are configured by secure instructions processed using commands associated with an ASR of the RISC-V processor.

5. The semiconductor chip of claim 1, wherein the processor core comprises a shadow stack configured to backup a return address included in a code sequence.

6. The semiconductor chip of claim 5, wherein the shadow stack does not use a bus, is not accessed by an OS or software, is automatically executed to backup the return address when a command related to a memory stack is executed,
and a security attack is detected by a sameness check with an original return address using the backed up return address.

7. The semiconductor chip of claim 1, further comprising:
an authentication part configured to perform mutual authentication with an outside trusted authority when the semiconductor chip is powered on,
wherein the second group is usable only when the authentication is successful.

8. The semiconductor chip of claim 1, wherein the secure mode is activated and at least a portion of the second group is operated if there is a security violation event or a call for processing at an increased security level while the second group is usable and the first group is operating.

9. The semiconductor chip of claim 1, wherein the second group includes at least one of a cryptographic IP, a secure SRAM, a secure DMA, and a boot ROM.

10. The semiconductor chip of claim 1, further comprising:
a PUF configured to provide a root key used by the authentication part for the mutual authentication with the outside trusted authority.

11. An operation method for a semiconductor system-on-chip, the operation method comprising:
performing mutual authentication with an outside trusted authority, the mutual authentication performed by an authentication part; and
activating a first group comprising elements connected to the processor core by a first bus and deactivating elements connected to the processor core by a second bus and configured to operate in a secure mode, if the authentication is not successful,
wherein the second group processes data by using a memory address different from that of the first group, and
wherein the processor core partitions a memory area into a code area and a data area and comprises a memory protection unit, the memory protection unit configured to prohibit writing in the code area and prohibit execution in the data area,
wherein the processor core comprises a RISC (reduced instruction set computing)-V processor, the RISC-V processor being a 32-bit RISC type embedded processor, and
wherein the second bus comprises a hidden bus implemented by using an ASR (application specific register) of the RISC-V processor as an address space for controlling elements included in the second group.

12. The operation method of claim 11, wherein the second group includes at least one of a cryptographic IP, a secure SRAM, a secure DMA, and a boot ROM.

13. The operation method of claim 11, wherein a root key used by the authentication part in the mutual authentication with the outside trusted authority is provided by a PUF included within the semiconductor system-on-chip.

14. The operation method of claim 11, further comprising:
activating the secure mode to operate at least a portion of the second group if there is a security violation event or a call for processing at an increased security level during an operation of the first group while the second group is in a usable state due to the authentication being successful.

15. The operation method of claim 11, wherein the processor core comprises a hardware-based shadow stack, and wherein the shadow stack does not use a bus, is not accessed by an OS or software, and is configured to back up a return address included in a code sequence.

16. The operation method of claim 15, further comprising:
backing up the return address when the processor core executes a command related to a memory stack; and
detecting an attack by comparing the return address with an original to check for sameness.

* * * * *